(12) United States Patent
Jang et al.

(10) Patent No.: US 12,262,114 B2
(45) Date of Patent: *Mar. 25, 2025

(54) CAMERA MODULE WITH SENSOR SHIFTING MODULE

(71) Applicant: SAMSUNG ELECTRO-MECHANICS CO., LTD., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 101 days.

This patent is subject to a terminal disclaimer.

(21) Appl. No.: 17/953,473

(22) Filed: Sep. 27, 2022

(65) Prior Publication Data

US 2023/0156329 A1 May 18, 2023

(30) Foreign Application Priority Data

Nov. 15, 2021 (KR) .................. 10-2021-0156565

(51) Int. Cl.
H04N 23/68 (2023.01)
G03B 17/56 (2021.01)

(52) U.S. Cl.
CPC ....... *H04N 23/6812* (2023.01); *G03B 17/561* (2013.01)

(58) Field of Classification Search
None
See application file for complete search history.

(56) References Cited

U.S. PATENT DOCUMENTS 10,863,094 B2 12/2020 Sharma et al.
2016/0127646 A1 5/2016 Osborne
(Continued)

FOREIGN PATENT DOCUMENTS

CN 101976010 A 2/2011
CN 110855874 A 2/2020
(Continued)

OTHER PUBLICATIONS

Korean Office Action issued on Feb. 1, 2023, in counterpart Korean Patent Application No. 10-2021-0156565 (7 pages in English, 5 pages in Korean).
(Continued)

*Primary Examiner* — Rodney E Fuller
(74) *Attorney, Agent, or Firm* — NSIP Law

(57) ABSTRACT

A sensor shifting module includes a fixed body; a first movable body, movably disposed in the fixed body, comprising an image sensor having an imaging plane opposite to a first direction; and a driver, configured to move the first movable body in a direction orthogonal to the first direction with respect to the fixed body, comprising a driving coil coupled to one of the fixed body and the first movable body, and a driving yoke coupled to another of the fixed body and the first movable body. The driving yoke is disposed to oppose the driving coil in the direction orthogonal to the first direction. When current is applied to the driving coil, the first movable body is configured to move in the direction orthogonal to the first direction by electromagnetic interaction between the driving coil and the driving yoke.

17 Claims, 16 Drawing Sheets

(56) References Cited

U.S. PATENT DOCUMENTS

| | | |
|---|---|---|
| 2021/0092264 A1 | 3/2021 | Kang |
| 2021/0173226 A1 | 6/2021 | Lee et al. |
| 2023/0126917 A1* | 4/2023 | Mori .................. H04N 23/54 348/373 |
| 2023/0156310 A1* | 5/2023 | Jang ................. H02K 41/0356 348/208.2 |
| 2023/0156333 A1* | 5/2023 | Jang ..................... G02B 26/00 348/208.7 |

FOREIGN PATENT DOCUMENTS

| | | |
|---|---|---|
| CN | 111758070 A | 10/2020 |
| CN | 113050344 A | 6/2021 |
| JP | 2007-13661 A | 1/2007 |
| JP | 2012-103376 A | 5/2012 |
| JP | 5453220 B2 | 3/2014 |
| KR | 10-2007-0070145 A | 7/2007 |
| KR | 10-2009-0043585 A | 5/2009 |
| KR | 10-2018-0118720 A | 10/2018 |
| KR | 10-2021-0083154 A | 7/2021 |
| WO | WO 2008/023815 A1 | 2/2008 |
| WO | WO 2017/149092 A9 | 4/2019 |

OTHER PUBLICATIONS

Chinese Office Action Issued on Dec. 31, 2024, in Counterpart Chinese Patent Application No. 202211418701.8 (6 Pages in English, 14 Pages in Chinese).

\* cited by examiner

CAMERA MODULE WITH SENSOR SHIFTING MODULE

CROSS-REFERENCE TO RELATED APPLICATION(S)

This application claims the benefit under 35 USC 119(a) of Korean Patent Application No. 10-2021-0156565 filed on Nov. 15, 2021 in the Korean Intellectual Property Office, the entire disclosure of which is incorporated herein by reference for all purposes.

BACKGROUND

1. Field

The following description relates to a camera module with sensor shifting module.

2. Description of Related Art

With the development of communications technology, mobile devices, such as smartphones, have been widely distributed. Accordingly, the demand for the functions of a camera included in mobile devices has also increased. For example, a camera included in a mobile device may be designed to provide advanced imaging functions (e.g., an autofocus function, an anti-shake function, and the like) implemented in a general DSLR camera despite the small size thereof.

The optical image stabilization function, that is, an optical image stabilization (OIS) function, may be provided to prevent image blur from occurring when a camera is shaken during the exposure time, and the OIS function may be desired when imaging in a low-light environment in which a camera is shaken and the exposure time is long. The OIS may include digital IS (DIS), electronic IS (EIS), and optical IS (OIS). Among these functions, optical IS (OIS) may fundamentally prevent image deterioration caused by shaking by correcting an optical path by moving a lens or image sensor in a direction orthogonal to the optical axis. Since a mechanical actuator may be desired, it may be complicated to implement as a device, and although relatively expensive, excellent compensation performance may be obtained.

A lens barrel may include an optical system therein, such that a relatively large amount of force may be required to drive the lens barrel. On the other hand, an image sensor may be relatively light and advantageous to implement an excellent OIS function even with a small force. However, when an actuator for driving the image sensor includes a permanent magnet, the magnetic field of the permanent magnet may affect neighboring electronic components. Also, when a mobile device includes a plurality of cameras disposed adjacently to each other, a permanent magnet in each camera may negatively affect the operation of the neighboring cameras, making it functionally difficult to dispose the cameras adjacent to each other or other electronic components in the camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sensor shifting module includes a fixed body; a first movable body, movably disposed in the fixed body, comprising an image sensor having an imaging plane opposite to a first direction; and a driver, configured to move the first movable body in a direction orthogonal to the first direction with respect to the fixed body, comprising a driving coil coupled to one of the fixed body and the first movable body, and a driving yoke coupled to another of the fixed body and the first movable body. The driving yoke is disposed to oppose the driving coil in the direction orthogonal to the first direction. When current is applied to the driving coil, the first movable body is configured to move in the direction orthogonal to the first direction by electromagnetic interaction between the driving coil and the driving yoke.

The driving yoke may be a soft magnetic material.

When no current flows in the driving coil, a magnetic field due to the driving yoke may be zero.

The driving coil and the driving yoke may oppose each other in a second direction orthogonal to the first direction, and electromagnetic interaction between the driving coil and the driving yoke may be configured to move the movable body in the second direction.

The driving coil and the driving yoke may oppose each other in a second direction orthogonal to the first direction. The driving coil may include a first driving coil and a second driving coil disposed on both sides of the first movable body in the second direction, respectively. The driving yoke may include a first driving yoke and a second driving yoke opposing the first driving coil and the second driving coil in the second direction, respectively.

The driver may further include a yoke disposed on one side of the driving coil, and the driving coil may be disposed between the driving yoke and the yoke.

The driving coil and the driving yoke may oppose each other in a diagonal direction of the image sensor.

The sensor shifting module may further include an elastic member, disposed between the first movable body and the fixed body, configured to deform based on a movement of the first movable body with respect to the fixed body.

The elastic member may be a leaf spring.

The sensor shifting module may further include a second movable body disposed between the first movable body and the fixed body; a first ball member disposed between the fixed body and the second movable body; and a second ball member disposed between the second movable body and the first movable body.

The fixed body and the second movable body may include a first groove configured to accommodate, at least, a portion of the first ball member, and the second movable body and the first movable body may include a second groove configured to accommodate, at least, a portion of the second ball member.

The first groove may extend in a second direction orthogonal to the first direction, and the second groove may extend in a third direction orthogonal to each of the first direction and the second direction.

The driver may further include a first magnetic body, coupled to the second movable body, and a second magnetic body, coupled to each of the first movable body and the fixed body, opposing the first magnetic body.

The second magnetic body may include a through-portion, and the driver further may include a position sensor disposed in the through-portion.

In another general aspect, a camera module includes a lens module including a lens, and a sensor shifting module. The sensor shifting module includes a fixed body; a first movable body, movably disposed in the fixed body, comprising an image sensor opposing a first direction; and a driver, configured to move the first movable body in a direction orthogonal to the first direction with respect to the fixed body, comprising a driving coil, coupled to one of the fixed body and the first movable body, and a driving yoke coupled to another of the fixed body and the first movable body. The driving yoke is disposed to oppose the driving coil in the direction orthogonal to the first direction, and a space between the driving yoke and the driving coil is an air gap.

The driving yoke may be a soft magnetic material.

The camera module may further include an elastic member, disposed between the first movable body and the fixed body, configured to deform based on a movement of the first movable body with respect to the fixed body.

Other features and aspects will be apparent from the following detailed description, the drawings, and the claims.

BRIEF DESCRIPTION OF DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
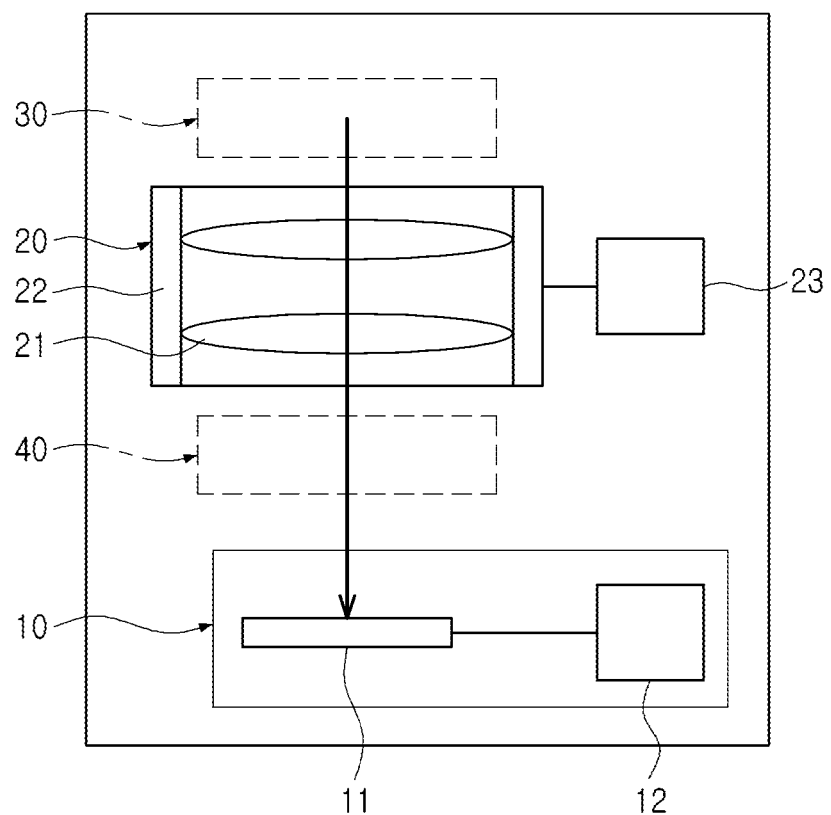
FIG. 1 is a diagram illustrating components included in a camera module according to an example embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the example embodiments, the X-direction, the Y-direction, and the Z-direction may refer to a direction parallel to the X axis, a direction parallel to the Y axis, and a direction parallel to the Z axis, respectively, in the drawings. Also, unless otherwise indicated, the X-direction may include both the +X-axis direction and the −X-axis direction, which may also apply to the Y-direction and the Z-direction.

In the example embodiments, two directions (or axes) parallel or orthogonal to each other may also include the examples in which the two directions (or axes) are substantially parallel to or substantially side by side to each other. For example, the configuration in which the first axis and the second axis are orthogonal to each other may indicate that the first axis and the second axis may form an angle of 90 degrees or an angle approximated to 90 degrees.

"An example embodiment" does not necessarily indicate the same example embodiments. The particular features, structures, or characteristics may be combined in any suitable manner consistent with the example embodiments.

In the example embodiments, "configured to" may indicate that a component may include a structure desired to implement a function.

FIG. 1 is a diagram illustrating components included in a camera module 1 according to an example embodiment.

In an example embodiment, the camera module 1 may include a lens module 20, including at least one lens 21, a lens barrel 22, accommodating at least one lens 21, and an image sensor 11. Light L may pass through the lens module 20 and may reach an imaging plane of the image sensor 11. The camera module 1 may include an AF driver 23, which may move the lens module 20 in an optical axis direction to adjust a focal length. The AF driver 23 may include, for example, a coil and a magnet opposing each other. The coil may be fixedly coupled to the lens module 20, the magnet may be coupled to a fixed body such as a housing, and electromagnetic interaction between the coil and the magnet may allow the lens module 20 to move in the optical axis direction.

In an example embodiment, the camera module 1 may provide an optical image stabilization (hereinafter, "OIS") function. The camera module 1 may provide an OIS function by driving the image sensor 11. For example, the camera module 1 may include an OIS driver 12 configured to move the image sensor 11 in a direction orthogonal to the optical axis or to allow the image sensor 11 to rotate about an axis parallel to the optical axis or to rotate about an axis orthogonal to the optical axis.

In an example embodiment, the camera module 1 may include a sensor shifting module 10. The sensor shifting module 10 may include components desired to implement the OIS function by driving the image sensor 11. For example, the sensor shifting module 10 may include an image sensor 11 and an OIS driver 12 for driving the image sensor 11. As another example, the sensor shifting module 10 may refer to only the OIS driver 12, excluding the image sensor 11.

In an example embodiment, the camera module 1 may further include an optical element in addition to the lens module 20 and the image sensor 11. In an example embodiment, the camera module 1 may include two or more lens modules. For example, the first optical element 30 and/or the second optical element 40 may be a lens module distinct from the lens module 20.

In an example embodiment, the camera module 1 may include an optical path changing element disposed in front of the lens module 20. For example, the first optical element 30 may be implemented as a prism or a mirror. In another example embodiment, the optical path changing element may be disposed between the image sensor 11 and the lens module 20. For example, the second optical element 40 may be implemented as a prism or a mirror.

Hereinafter, the sensor shifting module 100 or the OIS driver 120 described in FIGS. 2 to 8 may be applied to the camera module 1 in FIG. 1.

Figure 2:
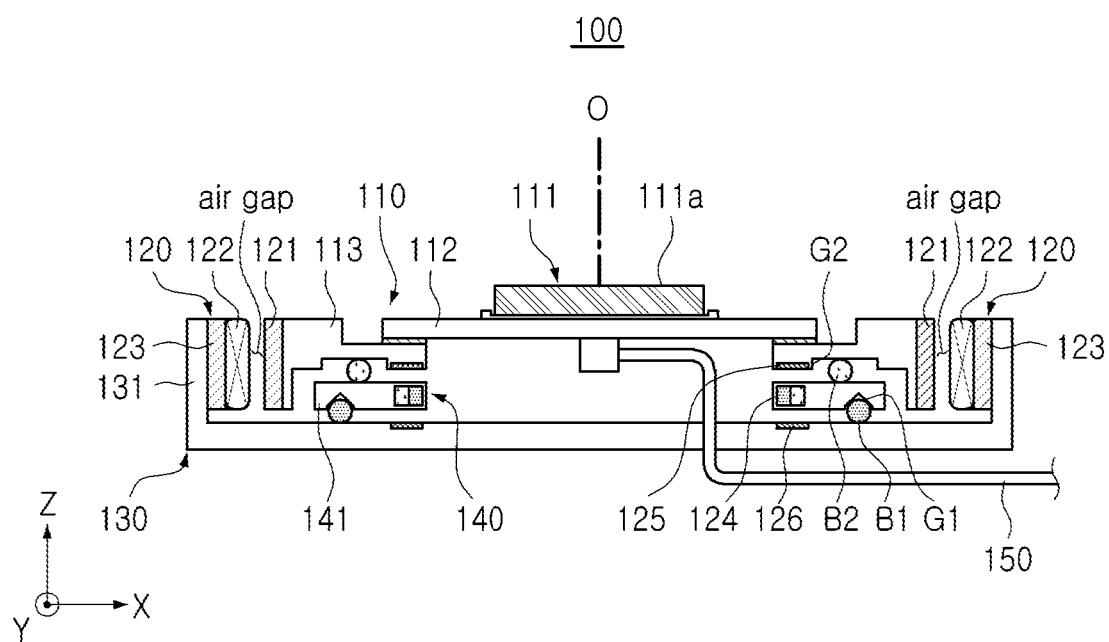
FIG. 2 is a diagram illustrating a sensor shifting module according to an example embodiment of the present disclosure.

FIG. 2 illustrates a sensor shifting module 100 according to an example embodiment. The sensor shifting module 100 may include an OIS driver 120 for driving the image sensor 111. In an example embodiment, the OIS driver 120 may include a first movable body 110, including an image sensor 111 and a fixed body 130. The first movable body 110 may be movably disposed in the fixed body 130. The first movable body 110 may be configured to move together with the image sensor 111. For example, the first movable body 110 may include a sensor substrate 112 on which the image sensor 111 is mounted and a sensor holder 113 coupled to the sensor substrate 112. A signal from the image sensor 111 may be transmitted to another electronic component (e.g., an image signal processor (ISP)) through the sensor substrate 112 and the connector 150.

The fixed body 130 may include a base 131 and components fixedly coupled to the base 131. For example, the fixed body 130 may include a driving coil 122 and a yoke 123 to be described later.

The first movable body 110 may, through the OIS driver 120, move in a direction orthogonal to a direction in which the imaging plane 111a of the image sensor 111 is directed. In an example embodiment, the OIS driver 120 may compensate for the shaking of the camera module 1 or the electronic device on which the image sensor 111 is mounted in a direction orthogonal to the optical axis O. The OIS driver 120 may move the image sensor 111 in a first direction and a second direction orthogonal to the optical axis O. As illustrated in FIG. The first direction and the second direction may intersect each other. For example, the OIS driver 120 may move the first movable body 110 in the X-direction and/or the Y-direction orthogonal to the Z axis, such that the shaking in the X-direction and/or the Y-direction may be corrected.

In the example embodiments, the direction in which the imaging plane 111a of the image sensor 111 is directed may be referred to as an optical axis O direction. That is, the first movable body 110 may move in a direction orthogonal to the optical axis O with respect to the fixed body 130. In the drawings, the optical axis O may be parallel to the Z axis; accordingly, the Z-direction may refer to the direction parallel to the optical axis O. Also, the X-direction or Y-direction may refer to a direction orthogonal to the optical axis O. For example, in the example embodiments, the configuration in which the first movable body 110 may in the X-direction may indicate that the first movable body 110 may move in a direction orthogonal to the optical axis O. For another example, the configuration in which the driving yoke 121 and the driving coil 122 oppose each other in the X-direction may indicate that the driving yoke 121 and the driving coil 122 may oppose each other in a direction orthogonal to the optical axis O. Also, the X-direction or the Y-direction may be an example of two directions orthogonal to the optical axis and intersecting each other, and in the example embodiments, the X-direction and the Y-direction may be two directions orthogonal to the optical axis O and intersecting each other.

In an example embodiment, the OIS driver 120 may include a second movable body 140 disposed between the first movable body 110 and the fixed body 130. The second movable body 140 may include a ball guide 141 and a component (e.g., a first magnetic body 124) fixedly coupled to the ball guide 141.

In an example embodiment, the first ball member B1 may be disposed between the fixed body 130 and the second movable body 140, and the second ball member B2 may be disposed between the second movable body 140 and the first movable body 110.

Each of the fixed body 130 and the second movable body 140 may include a first groove G1 for accommodating at least a portion of the first ball member B1. Each of the second movable body 140 and the first movable body 110 may include a second groove G2 for accommodating at least a portion of the second ball member B2.

In the example embodiment, the number of each of the first ball member B1, the second ball member B2, the first groove G1, and the second groove G2 may be described as one, but a plurality of each component may be provided.

The first groove G1 and the second groove G2 may extend in two directions orthogonal to the optical axis O, respectively, and intersecting each other. For example, when the optical axis O is parallel to the Z axis, the first groove G1 may extend in the Y-direction, and the second groove G2 may extend in the X-direction. The first ball member B1 and the second ball member B2 move along the first groove G1 and the second groove G2, respectively. Accordingly, the movement direction of the second movable body 140 with respect to the fixed body 130 may be limited to the Y-direction, and the movement direction of the first movable body 110 with respect to the second movable body 140 may be limited to the Y-direction.

In FIG. 2, the first groove G1 and the second groove G2 may be formed only in the second movable body 140 and the first movable body 110, respectively, but an example embodiment thereof is not limited thereto. For example, the first groove G1 may be formed in both the base 131 and the ball guide 141. Also, the second groove G2 may be formed in both the ball guide 141 and the sensor holder 113.

The second movable body 140 or the ball guide 141 may not be essential components, and the first movable body 110 may move directly on the base 131. For example, in FIG. 2, the second movable body 140 may not be provided, a ball member may be disposed between the sensor holder 113 and the base 131, and the sensor holder 113 and/or the base 131 may include a groove to accommodate the ball member.

Figure 3:
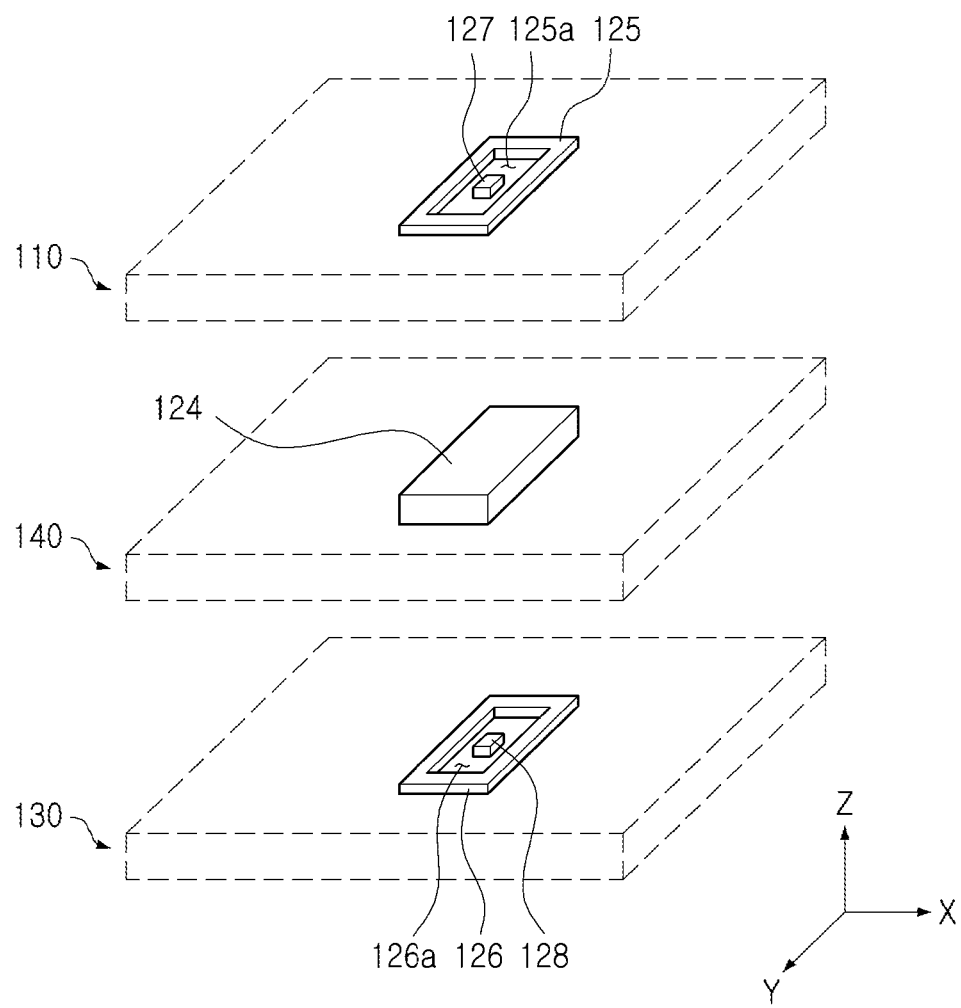
FIG. 3 is a diagram illustrating a pulling means and a position sensor according to an example embodiment of the present disclosure.

FIG. 3 illustrates a pulling means and a position sensor according to an example embodiment.

The first movable body 110 may need to move only in a direction orthogonal to the optical axis O, and may not move in a direction parallel to the optical axis O. To this end, the OIS driver 120 may include a pulling means. The pulling means may include the second magnetic bodies 125 and 126 and the first magnetic body 124 disposed to oppose each other in the optical axis O direction. A magnetic attraction may act between the first magnetic body 124 and the second magnetic body 125 and 126. For example, the first magnetic body 124 may be a permanent magnet, and the second magnetic body 125 and 126 may be a yoke. As another example, the first magnetic body 124 and the second magnetic body 125 and 126 may be permanent magnets.

In an example embodiment, the first magnetic body 124 may be coupled to the ball guide 141, and a 2-1 magnetic material 125 and a 2-2 magnetic material 126 opposing the first magnetic body 124 in the Z-direction may be disposed in the sensor holder 113 and the base 131, respectively.

Referring to FIGS. 2 and 3, the first movable body 110 may be pulled toward the base 131 by magnetic force arising between the second magnetic bodies 125 and 126 and the first magnetic body 124, and the first ball member B1 and the second ball member B2 may roll while being in close contact with the first groove G1 and the second groove G2, respectively. When the second movable body 140 may not be provided, the magnet and the yoke may be mounted on the sensor holder 113 or the base 131, respectively, such that the magnetic force between the components may pull the sensor holder 113 toward the base 131 (that is, −Z-direction)

Referring to FIG. 3, in an example embodiment, the OIS driver 120 may include a position sensor 127 and 128 which may measure how much the first movable body 110 moves in a direction orthogonal to the optical axis O. The position sensors 127 and 128 may be configured as Hall sensors or magnetoresistance sensors.

The position sensors 127 and 128 may be disposed to oppose the first magnetic body 124. For example, the position sensors 127 and 128 may be disposed on the sensor holder 113 and/or the base 131 to oppose the first magnetic body 124. In an example embodiment, the position sensors 127 and 128 may be disposed in the second magnetic bodies 125 and 126. In an example embodiment, the second magnetic bodies 125 and 126 may include through-portions 125a and 126a, and the position sensors 127 and 128 may be disposed in the through-portions 125a and 126a.

The first movable body 110 may move in the X-direction with respect to the second movable body 140, and the first position sensor 127 disposed in the 2-1 magnetic body 125 may measure a displacement in the X-direction between 110 and the second movable body 140. The second movable body 140 may move in the Y-direction with respect to the fixed body 130, and the second position sensor 128 disposed in the 2-2 magnetic body 126 may measure a displacement in the Y-direction between the fixed body 130 and the second movable body 130.

The first position sensor 127 coupled to the first movable body 110 may be electrically connected to the other electronic components through a flexible substrate. For example, a signal generated by the first position sensor 127 may be electrically connected to a connector 150 through an electrical wiring provided on the sensor substrate 112.

Referring to FIG. 2, in an example embodiment, the OIS driver 120 may include a driving coil 122 coupled to one of a first movable body 110 and a fixed body 130, and a driving yoke 121 coupled to the other of the first movable body 110 and the fixed body 130. For example, referring to FIG. 2, in an example embodiment, the driving coil 122 and the driving yoke 121 may be coupled to the base 131 and the sensor holder 113, respectively. The driving yoke 121 and the driving coil 122 may oppose each other in a direction orthogonal to the optical axis O. Electromagnetic interaction between the driving yoke 121 and the driving coil 122 may allow the first movable body 110 to move in a direction orthogonal to the optical axis O with respect to the fixed body 130.

In an example embodiment, the OIS driver 120 may further include a yoke 123 disposed on one side of the coil. The yoke 123 may allow the magnetic field generated in the coil to be concentrated only in a direction toward the driving yoke 121. Since the yoke 123 is disposed on one side of the driving coil 121, the magnetic field generated by the driving coil 121 may be prevented from affecting the other electronic components or the effect of the magnetic field on the other electronic components may be reduced.

In the example embodiments, the driving coil 122 and the driving yoke 121 may be coupled to the fixed body 130 and the first movable body 110, respectively, but an example embodiment thereof is not limited thereto. In another example embodiment, the driving coil 122 and the driving yoke 121 may be coupled to the first movable body 110 and the fixed body 130, respectively. For example, the driving coil 122 and the driving yoke 121 may be coupled to the sensor holder 113 and the base 131, respectively.

An air gap may be formed between the driving coil 122 and the driving yoke 121. Alternatively, a space between the driving coil 122 and the driving coil 121 may be an air gap. That is, no other member (e.g., a magnet) may be present between the driving coil 122 and the driving yoke 121. The driving coil 122 and the driving yoke 121 may directly oppose each other with an air gap therebetween.

FIG. 2 illustrates components of the OIS driver 120, and the example embodiment thereof is not limited to the structure in FIG. 2.

In an example embodiment, the OIS driver 120 may not include a permanent magnet. In an example embodiment, when no current flows in the driving coil 122, the magnetic field caused by the driving yoke 121 may be zero or at a very small level. Accordingly, the magnetic field caused by the OIS driver 120 may be prevented from affecting the other electronic components (e.g., the other electronic components in the camera module 1, or the other electronic components in the camera module 1) or the effect of the magnetic field on the other electronic components may be reduced.

In an example embodiment, the driving yoke 121 may be a soft magnetic material. A soft magnetic material may have a small coercive force and may be magnetized when exposed to a magnetic field, but when the magnetic field disappears, the driving yoke 121 may have a relatively low level of magnetism or may lose magnetism.

When a current is applied to the driving coil 122, the driving yoke 121 may be magnetized, such that reluctance force may arise between the driving coil 122 and the driving yoke 121. Attractive force may arise in a direction in which the driving yoke 121 and the driving coil 122 oppose each other, and the attractive force may move the first movable body 110 in the corresponding direction with respect to the fixed body 130. For example, referring to FIG. 4A, when a current is applied to the first driving coil 122, an attractive force may arise between the first driving coil 122 and the first driving yoke 121, and may move the first movable body 110 in the −X-direction. When a current is applied to the second driving coil 122, an attractive force may arise between the second driving coil 122 and the second driving yoke 121, moving the first movable body 110 in the +X-direction.

Figure 4A:
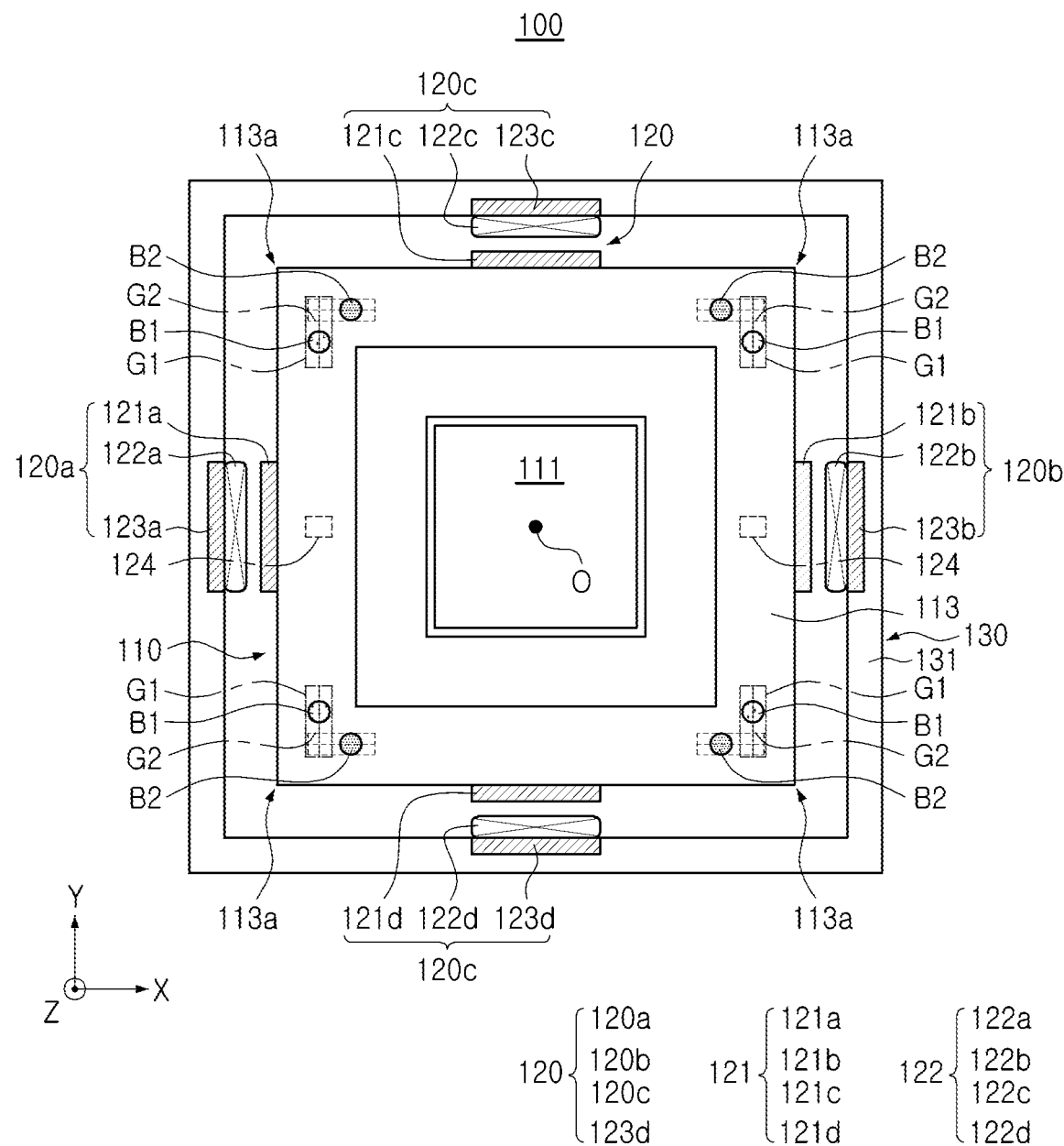
FIGS. 4A to 4C are diagrams illustrating an OIS driver according to an example embodiment of the present disclosure.
Figure 4B:
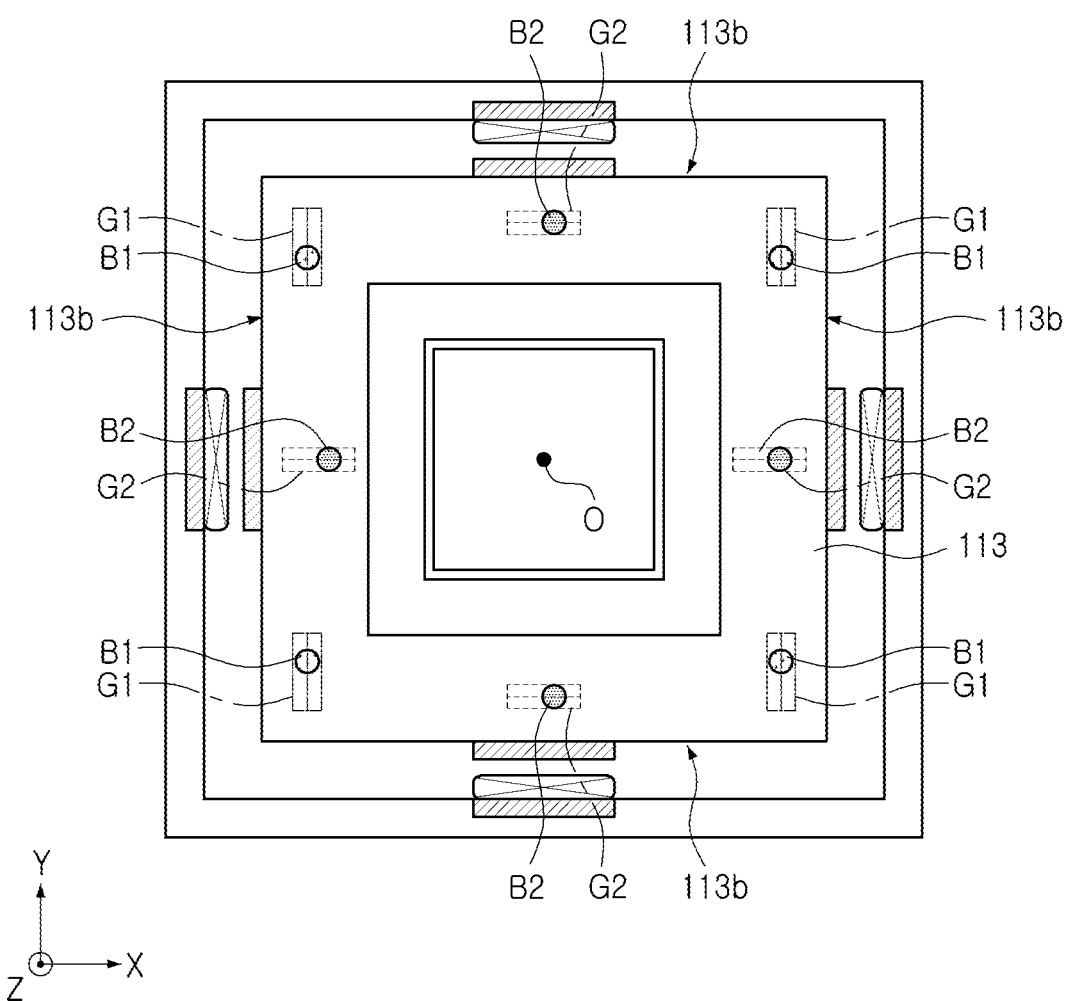
Figure 4C:
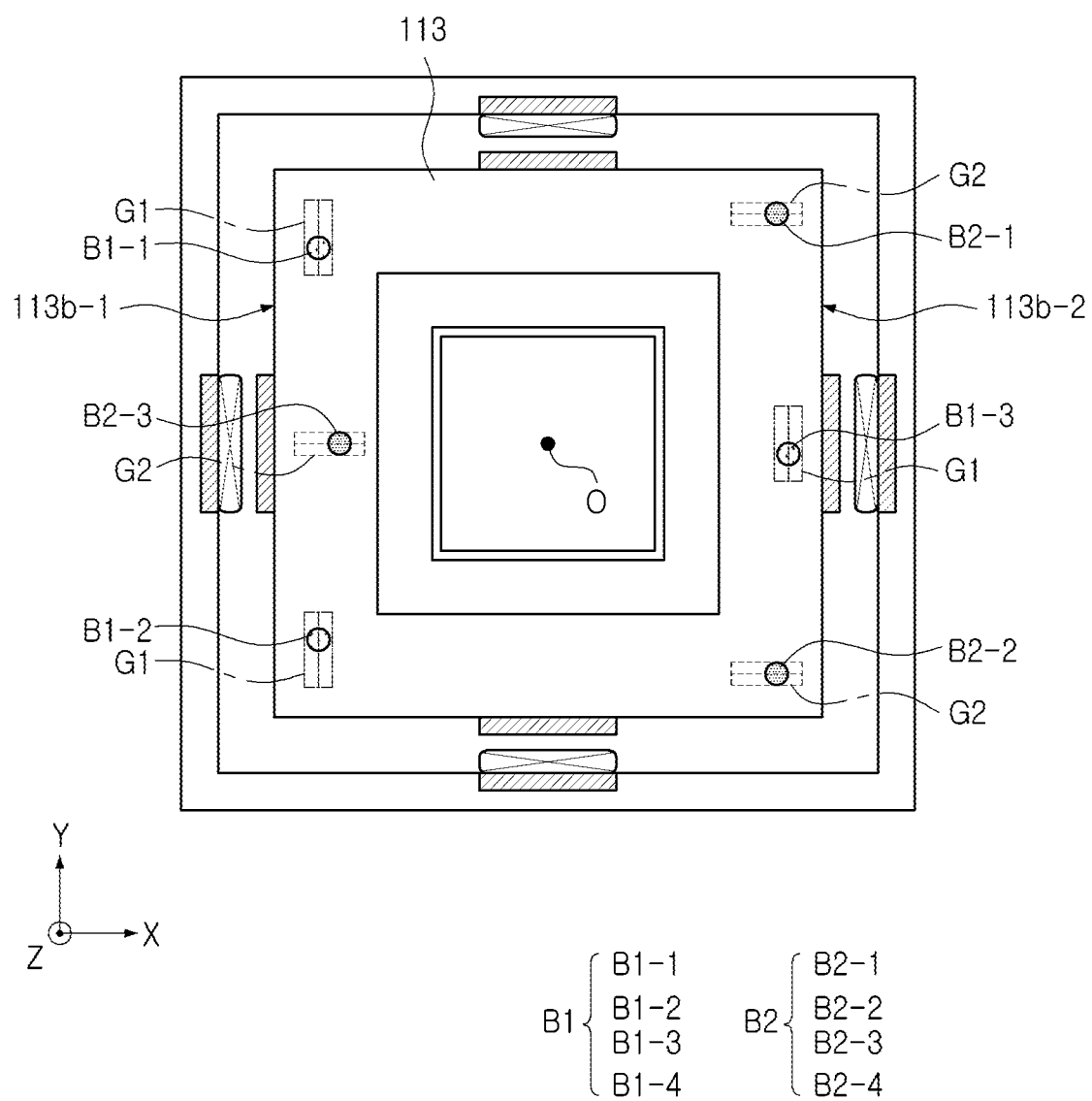

FIGS. 4A to 4C are diagrams illustrating an OIS driver 120 according to an example embodiment, illustrating a ball member and a groove arranged differently from the examples in FIG. 4B, and the descriptions of the other components may be the same as the descriptions described with reference to FIG. 4A.

The OIS driver 120 may include a plurality of unit drivers 120a, 120b, 120c, and 120d. The unit drivers 120a, 120b, 120c, and 120d may include a driving yoke 121 and a driving coil 122 opposing each other. The unit drivers 120a, 120b, 120c, and 120d may further include a yoke 123 disposed on one side of the driving coil 122. For example, the first unit driver 120a may include a first driving yoke 121a, a first driving coil 122a, and a first yoke 123a.

Since only attractive force arises between the driving coil 122 and the driving yoke 121, at least two unit drivers may be required to move back and forth the first movable body 110 in one direction.

Referring to FIG. 4A, the OIS driver 120 may include a first unit driver 120a disposed in the −X-direction of the first movable body 110 and a second unit driver 120b disposed in the +X-direction of 110 to compensate for shaking in the X-direction. The first unit driver 120a may include a first driving yoke 121a coupled to the first movable body 110, and a first driving coil 122a coupled to the base 131. The first unit driver 120a may further include a first yoke 123a disposed on one side of the first driving coil 122a. The second unit driver 120b may include a second driving yoke 121b coupled to the first movable body 110 and a second driving coil 122b coupled to the base 131. The second unit driver 120b may further include a second yoke 123b disposed on one side of the second driving coil 122b.

Referring to FIG. 4A, the OIS driver 120 may include a third unit driver 120c disposed in the +Y-direction of the first movable body 110, and a fourth unit driver 120d disposed in the −Y-direction of the first movable body 110 to compensate for the shaking in Y-direction. The third unit driver 120c may include a third driving yoke 121c coupled to the first movable body 110, and a third driving coil 122c coupled to the base 131. The third unit driver 120c may further include a third yoke 123c disposed on one side of the third driving coil 122c. The fourth unit driver 120d may include a fourth driving yoke 121d coupled to the first movable body 110, and a fourth driving coil 122d coupled to the base 131. The fourth unit driver 120d may further include a fourth yoke 123d disposed on one side of the fourth driving coil 122d.

Referring to FIG. 4a, the grooves G1 and G2 for guiding the ball member B1 and B2 and the ball member B1 and B2 may be disposed adjacently to the corner 113a of the sensor holder 113. The first groove G1 for accommodating the first ball member B1 and the first ball member B1 may be disposed adjacently to the corner 113a of the sensor holder 113, and the second groove G2 for accommodating the ball member B2 and the second ball member B2 may also be disposed adjacently to the corner 113a of the sensor holder 113. Referring to FIG. 4A, the first groove G1 and the second groove G2 may overlap each other in the optical axis O direction.

Referring to FIG. 4b, the ball member B1 and B2 and the groove G1 and G2 may be disposed between the two neighboring corners 113a. The ball members B1 and B2 and the grooves G1 and G2 may be disposed adjacently to the center of the side surface 113b connecting the two neighboring corners 113a to each other. For example, the second ball member B2 and the second groove G2 partially accommodating the second ball member B2 may be disposed adjacently to the center of the side surface 113b of the sensor holder 113. The first ball member B1 and the first groove G1 may be disposed adjacently to both ends of the side surface 113b of the sensor holder 113 as in FIG. 4A. In FIG. 4B, the first groove G1 and the second groove G2 may not overlap in the optical axis O direction. Accordingly, rigidity of the ball guide 141, including both the first groove G1 and the second groove G2 may improve.

Referring to FIG. 4c, three first ball members B1-1, B1-2, and B1-3 may be disposed between the second movable body 140 and the fixed body 130. Two first ball members B1-1 and B1-2 among the three first ball members B1-1, B1-2, and B1-3 may be disposed adjacently to both ends of one side surface 113b-1 (e.g., the side surface oriented in the −X-direction) of the sensor holder 113, and the other B1-3 may be disposed adjacently to the center of the other side surface 113b-2 (e.g., the side surface oriented in the +X-direction). Accordingly, the second movable body 140 may be supported at three points by the first ball members B1-1, B1-2, and B1-3.

Referring to FIG. 4c, three second ball members B2-1, B2-2, and B2-3 may be disposed between the first movable body 110 and the second movable body 140. Two second ball members B2-1 and B2-2 among the three second ball members B2-1, B2-2, and B2-3 may be disposed adjacently to both ends of one side surface 113b-2 (e.g., the side surface oriented in the −X-direction) of the sensor holder 113, and the other B2-3 may be adjacent to the center of the other side surface 113b-1 (e.g., the side surface oriented in the +X-direction). Accordingly, the first movable body 110 may be supported at three points by the second ball members B2-1, B2-2, and B2-3.

FIGS. 5A to 5D are diagrams illustrating the movement of a first movable body due to an OIS driver in FIG. 4A.

Figure 5A:
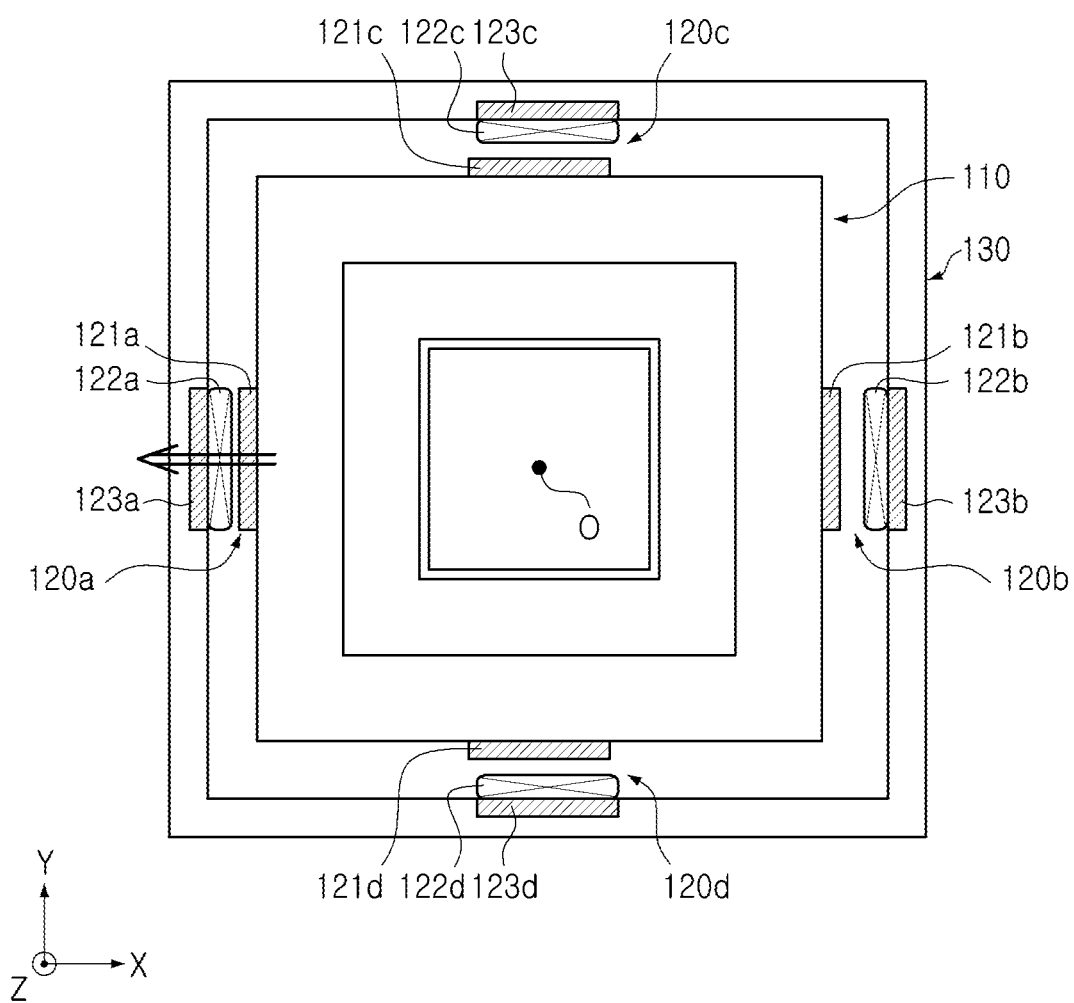
FIGS. 5A to 5D are diagrams illustrating the movement of a first movable body due to an OIS driver in FIG. 4A.
Figure 5B:
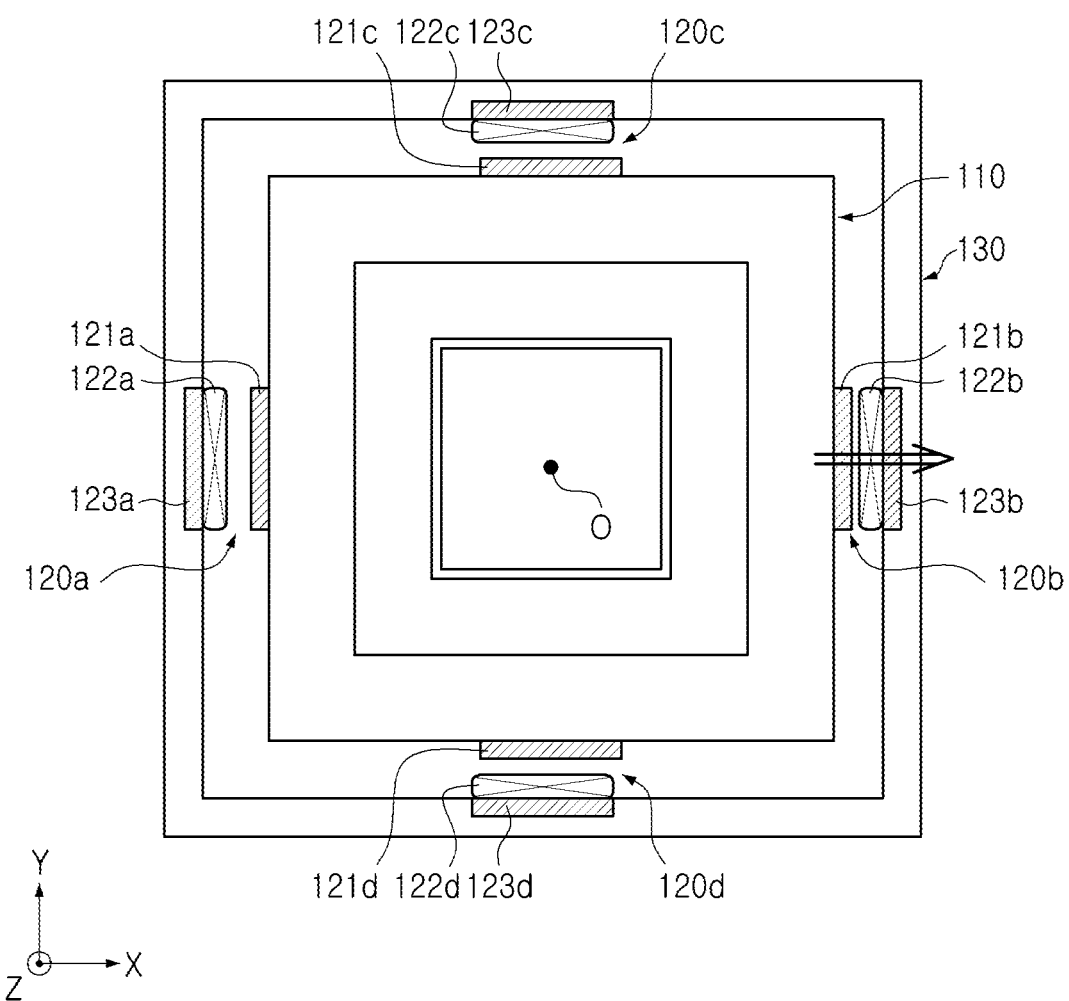
Figure 5C:
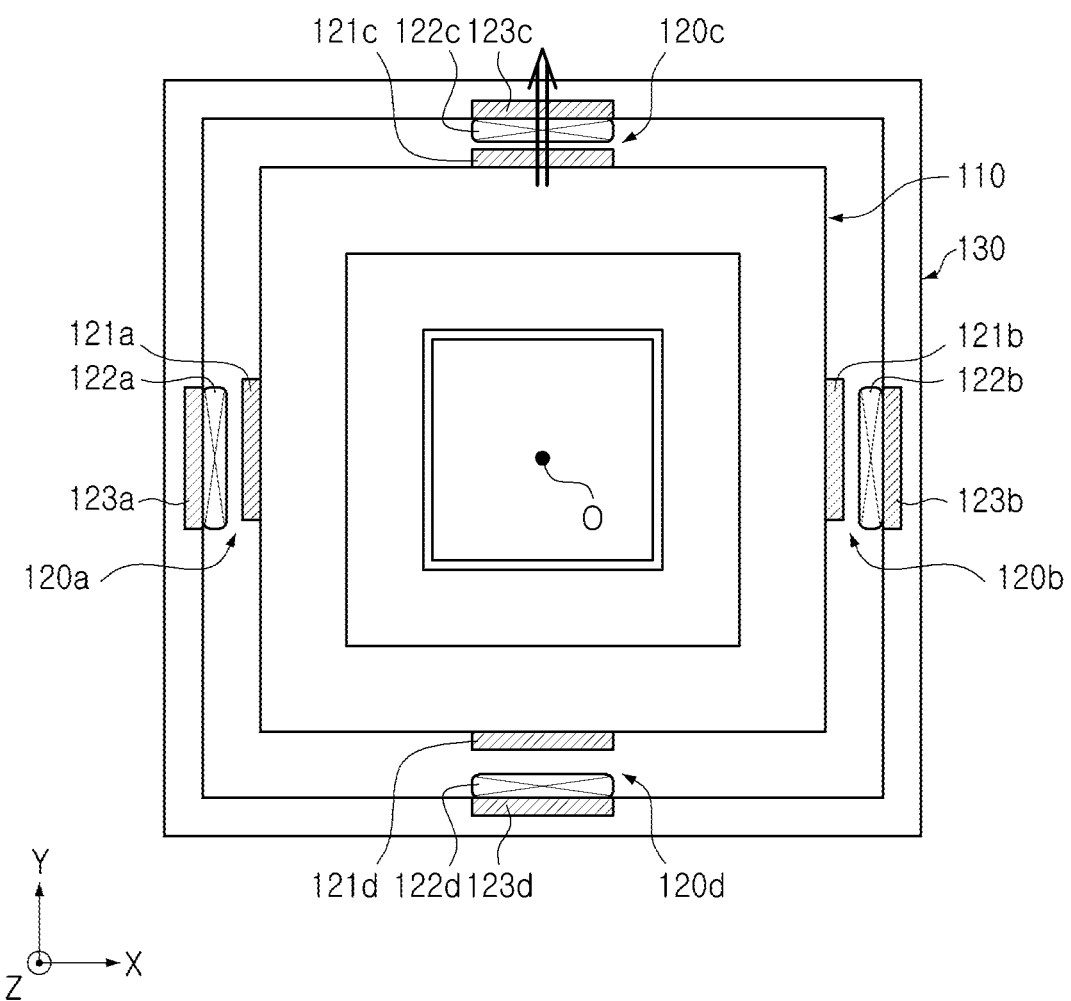
Figure 5D:
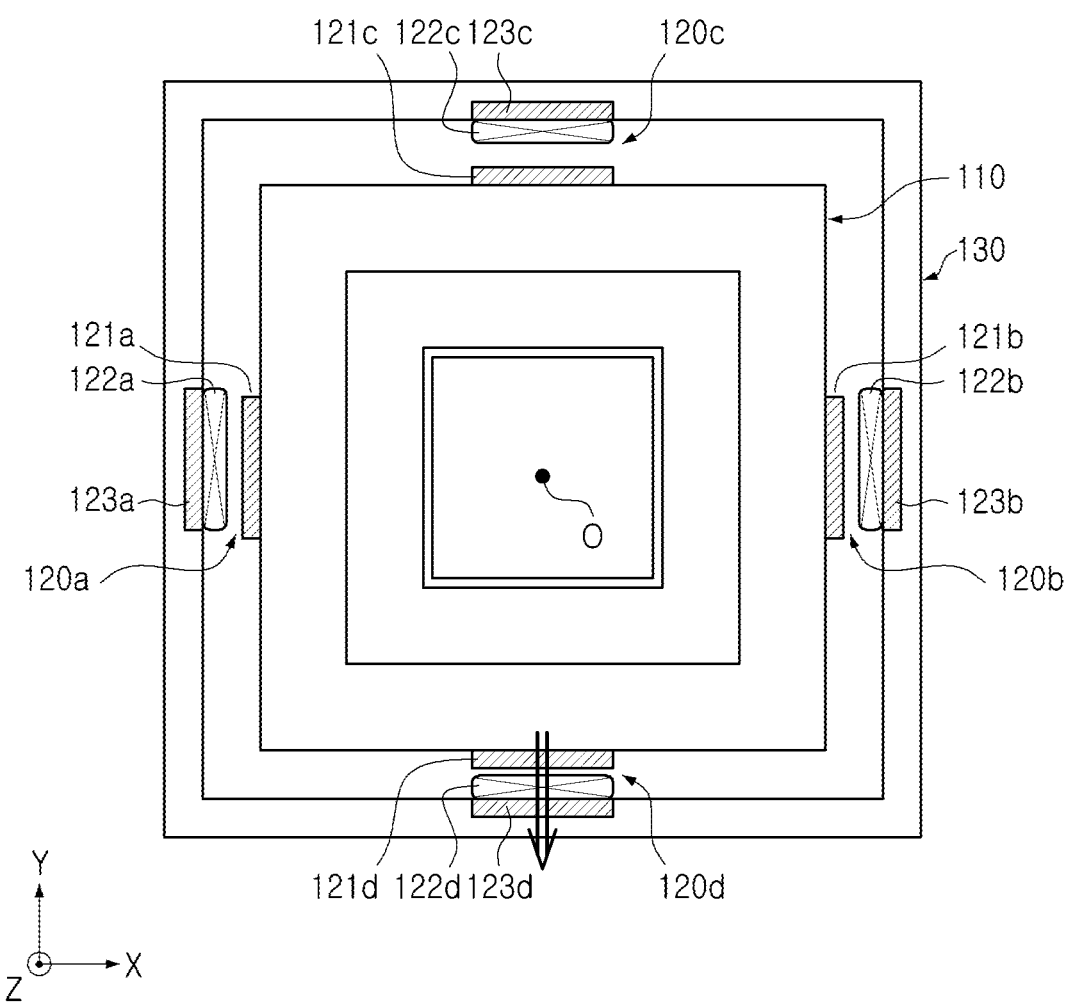

Referring to FIG. 5A, a current may be applied to the first driving coil 122a such that the first driving coil 122a may pull the first driving yoke 121a in the direction of an arrow, and accordingly, the first movable body 110 may move in the −X-direction. Referring to FIG. 5B, a current may be applied to the second driving coil 122b such that the second driving coil 122b may pull the second driving yoke 121b in the direction of an arrow, and accordingly, the first movable body 110 may move in the +X-direction. Referring to FIG. 5C, a current may be applied to the third driving coil 122c such that the third driving coil 122c may pull the third driving yoke 121c in the direction of the arrow, and accordingly, the first movable body may move in the +Y-direction. Referring to FIG. 5D, a current may be applied to the fourth driving coil 122d such that the fourth driving coil 122d may pull the fourth driving yoke 121d in the direction of the arrow, and accordingly, the first movable body 110 may move in the −Y-direction.

Figure 6:
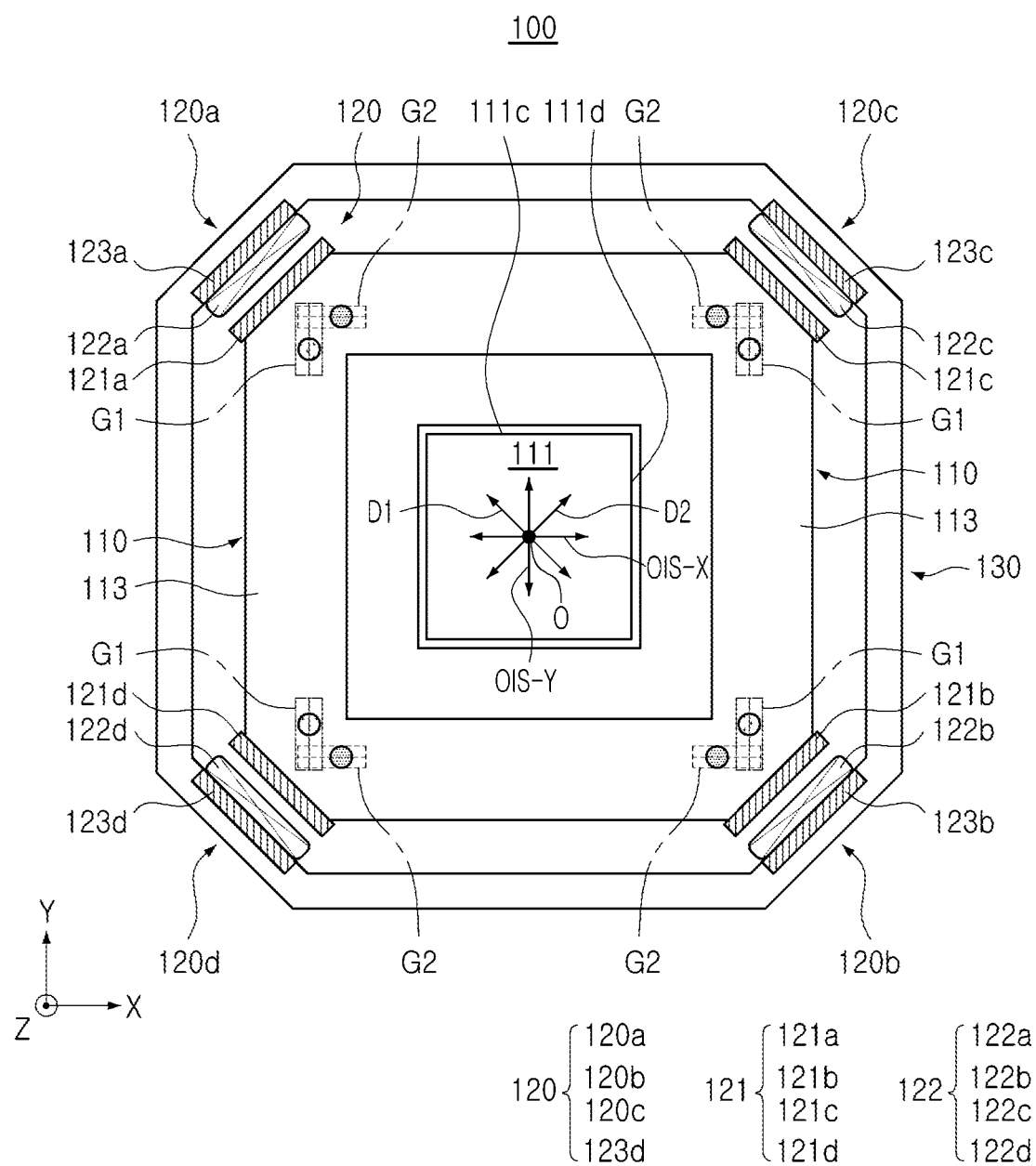
FIG. 6 is a diagram illustrating an example in which unit drivers are disposed in a diagonal direction of a driving direction of an image sensor according to an example embodiment of the present disclosure.

FIG. 6 is a diagram illustrating an example in which unit drivers 120a, 120b, 120c, and 120d are disposed in a diagonal direction of a driving direction of an image sensor according to an example embodiment.

In an example embodiment, the first movable body 110 may move in two directions orthogonal to the optical axis and orthogonal to each other. For example, the first movable body 110 may move in the X-direction and the Y-direction. The OIS driver 120 may allow the first movable body 110 to move in a first direction OIS-X parallel to the horizontal side 111c of the image sensor 111 and in a second direction OIS-Y parallel to the vertical side 111d of the image sensor 111. For example, referring to FIG. 6, the image sensor 111 may include a horizontal side 111b extending in the X-direction and a vertical side 111c extending in the Y-direction, and a first groove G1 and a second groove G1 may extend in the Y-direction and the X-direction, respectively.

Referring to FIG. 6, the unit drivers 120a, 120b, 120c, and 120d may be disposed orthogonal to the optical axis O the two movement directions OIS-X and OIS-Y orthogonal to the optical axis O and orthogonal to each other. For example, the first unit driver 120a and the second unit driver 120b may be disposed on both sides of the image sensor 111 in the first diagonal direction D1. The third unit driver 120c and the fourth unit driver 120d may be disposed on both sides of the image sensor 111 in the second diagonal direction D2.

In an example embodiment, when the OIS driver 120 is configured to move the first movable body 110 in a first direction OIS-X and the second direction OIS-Y, the driving coil 122 and the driving yoke 121 may oppose each other in a direction between the first direction OIS-X and the second direction OIS-Y. For example, when the OIS driver 120 is configured to move the first movable body 110 in the X-direction and the Y-direction, the driving coil 122 and the driving yoke 121 may oppose each other in the angular directions D1 and D2, forming 45 degrees to the X-axis or the Y-axis.

Even when the unit drivers 120a, 120b, 120c, and 120d are disposed as illustrated in FIG. 6, the grooves G1 and G2 for guiding the ball members B1 and B2 and the ball members B1 and B2 may be disposed as in FIG. 4B or 4C.

FIGS. 7A to 7D are diagrams illustrating the movement of a first movable body due to an OIS driver in FIG. 6.

Figure 7A:
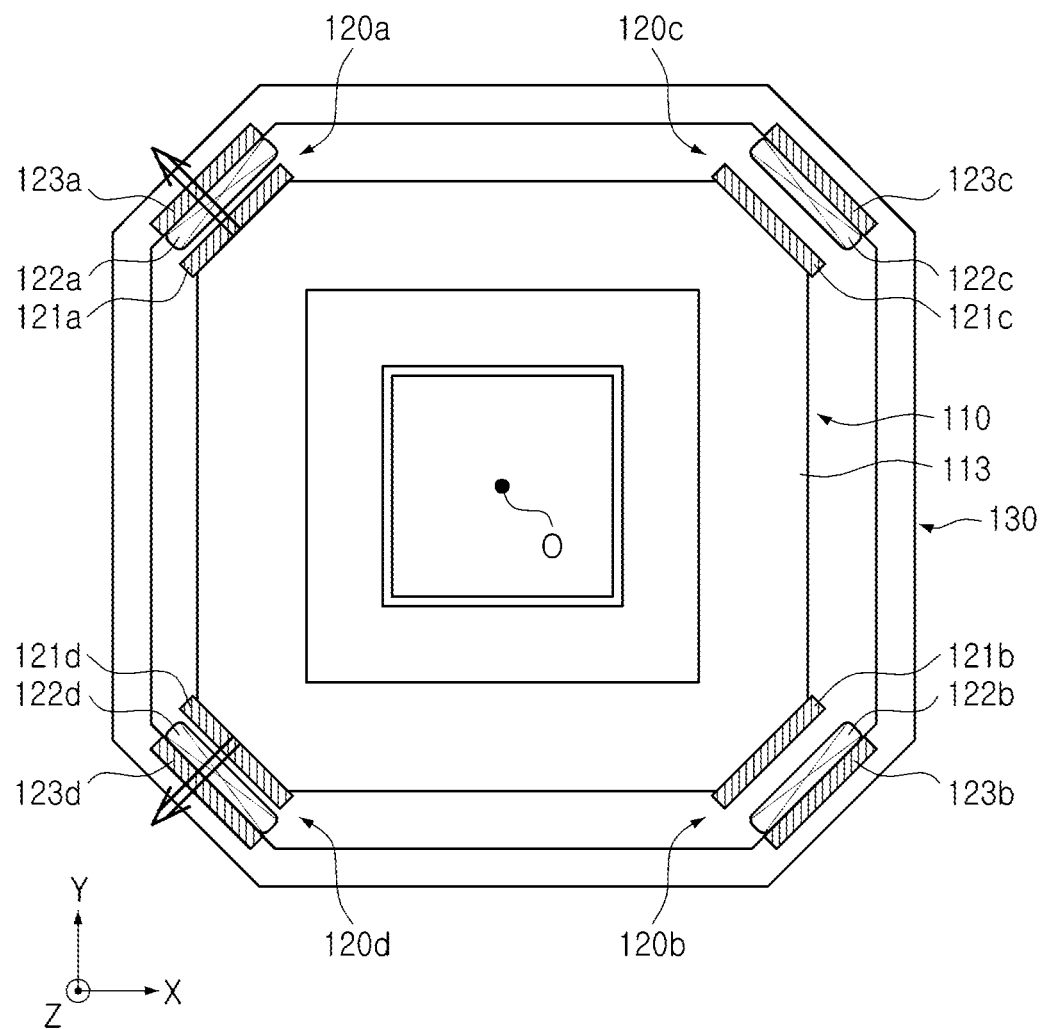
FIGS. 7A to 7D are diagrams illustrating movement of a first movable body due to an OIS driver in FIG. 6.
Figure 7B:
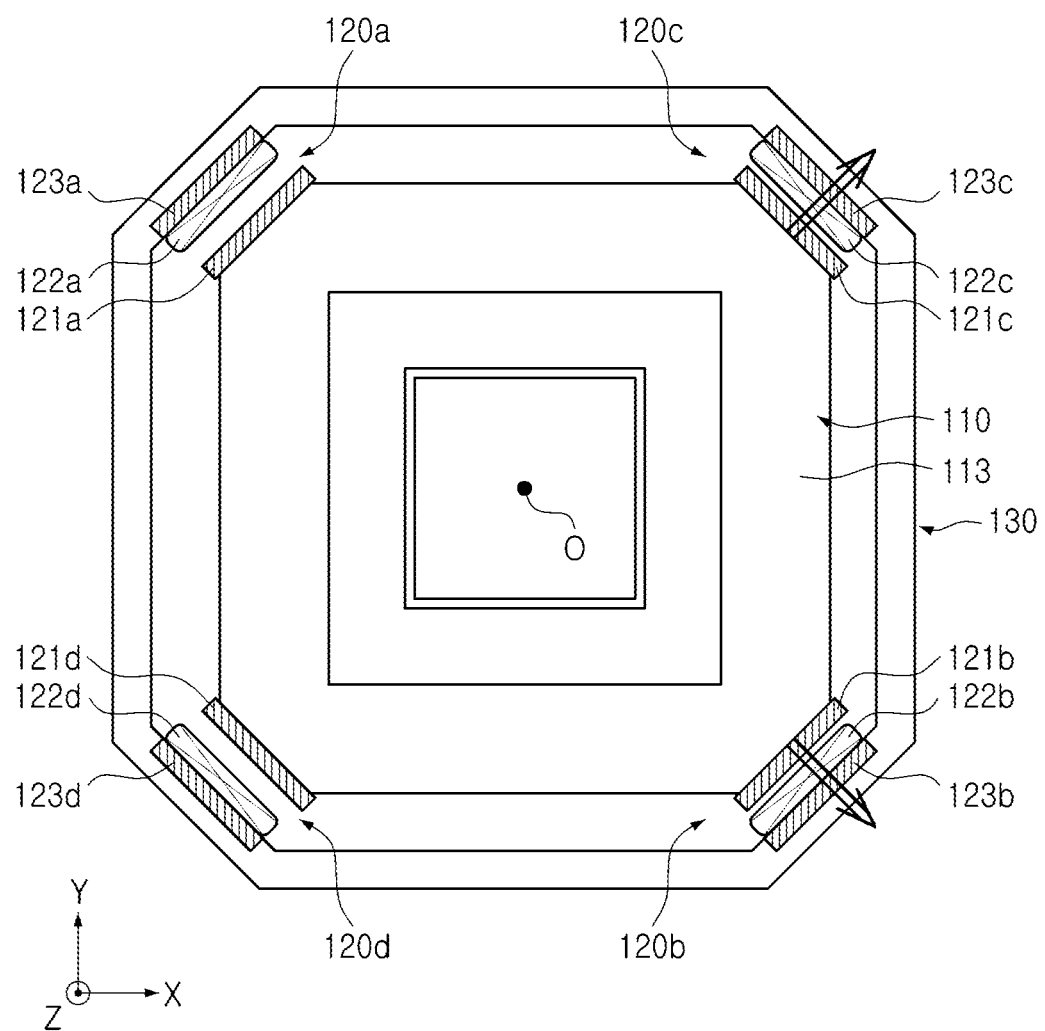
Figure 7C:
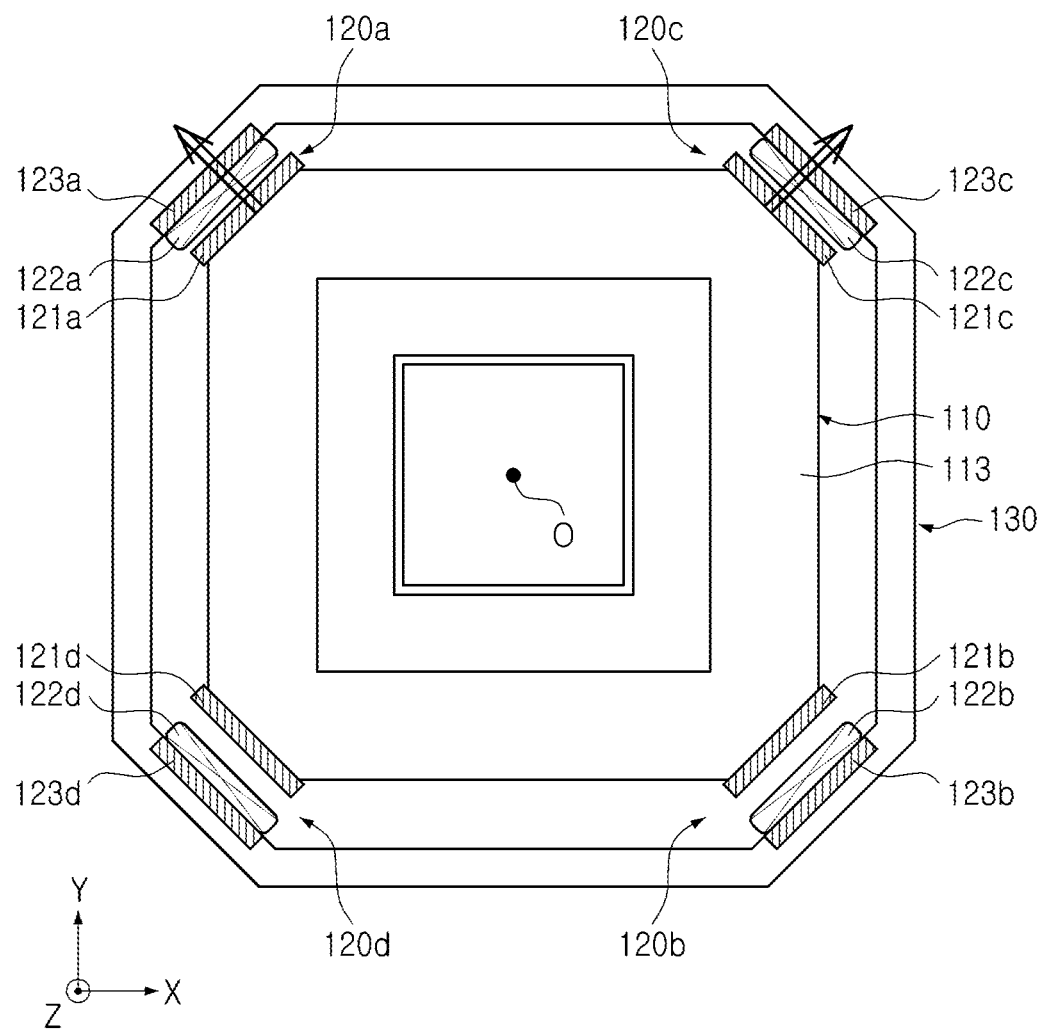
Figure 7D:
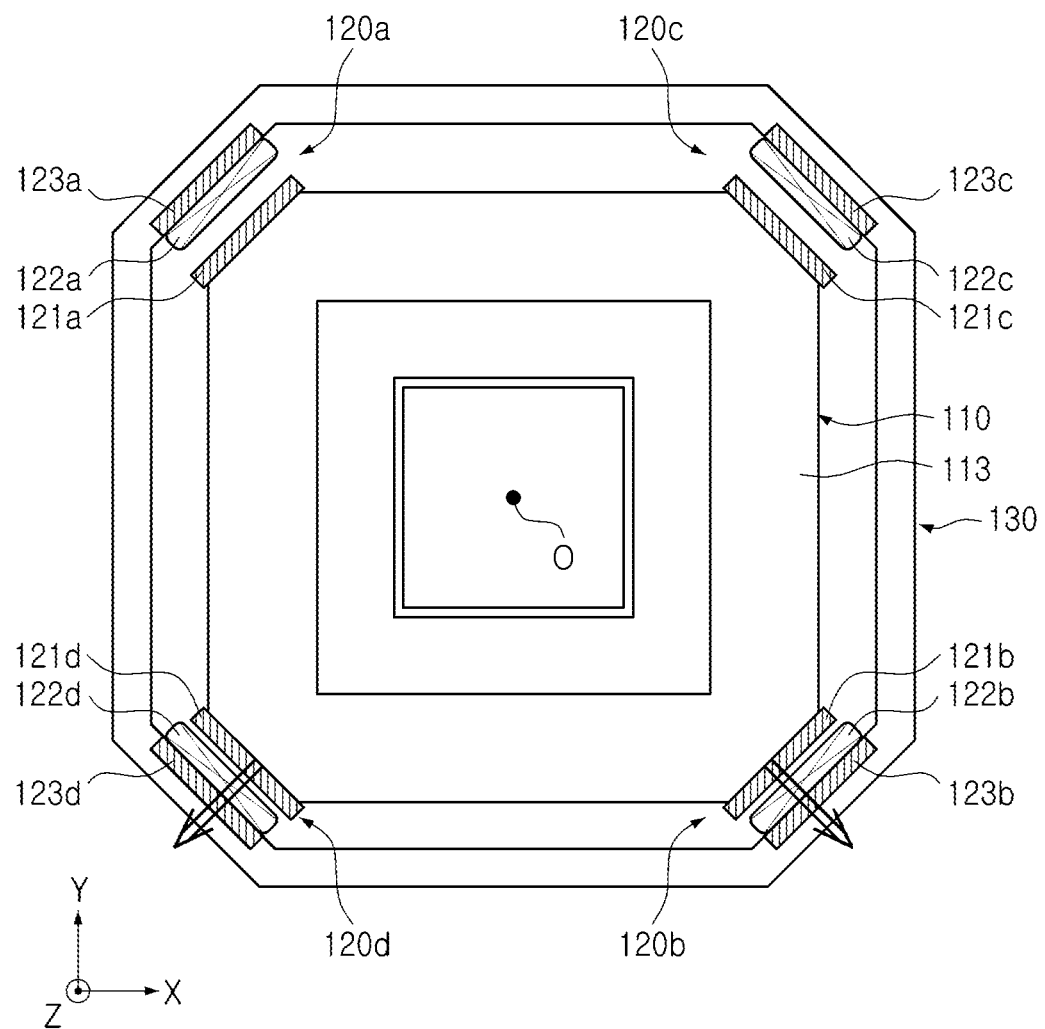

Referring to FIG. 7A, a current may be applied to the first driving coil 122a and the fourth driving coil 122d such that the first driving coil 122a and the fourth driving coil 122d may pull the first driving yoke 121a and the second driving yoke 121b in the direction of the arrow, and accordingly, the first movable body 110 may move in the −X-direction. Referring to FIG. 7B, a current may be applied to the second driving coil 122b and the third driving coil 122c such that the second driving coil 122b and the third driving coil 122c may pull the second driving yoke 121b and the third driving yoke 121c in the direction of the arrow, and accordingly, the first movable body 110 may move in the +X-direction. Referring to FIG. 7C, a current may be applied to the first driving coil 122a and the third driving coil 122c such that the first driving coil 122a and the third driving coil 122c may pull the first driving yoke 121a and the third driving yoke 121c in the direction of the arrow, and accordingly, the first movable body 110 may move in the +Y-direction. Referring to FIG. 7D, a current may be applied to the second driving coil 122b and the fourth driving coil 122d such that the second driving coil 122b and the fourth driving coil 122d may pull the second driving yoke 121b and the fourth driving yoke 121d in the direction of the arrow, and accordingly, the first movable body 110 may move in the −Y-direction.

Figure 8:
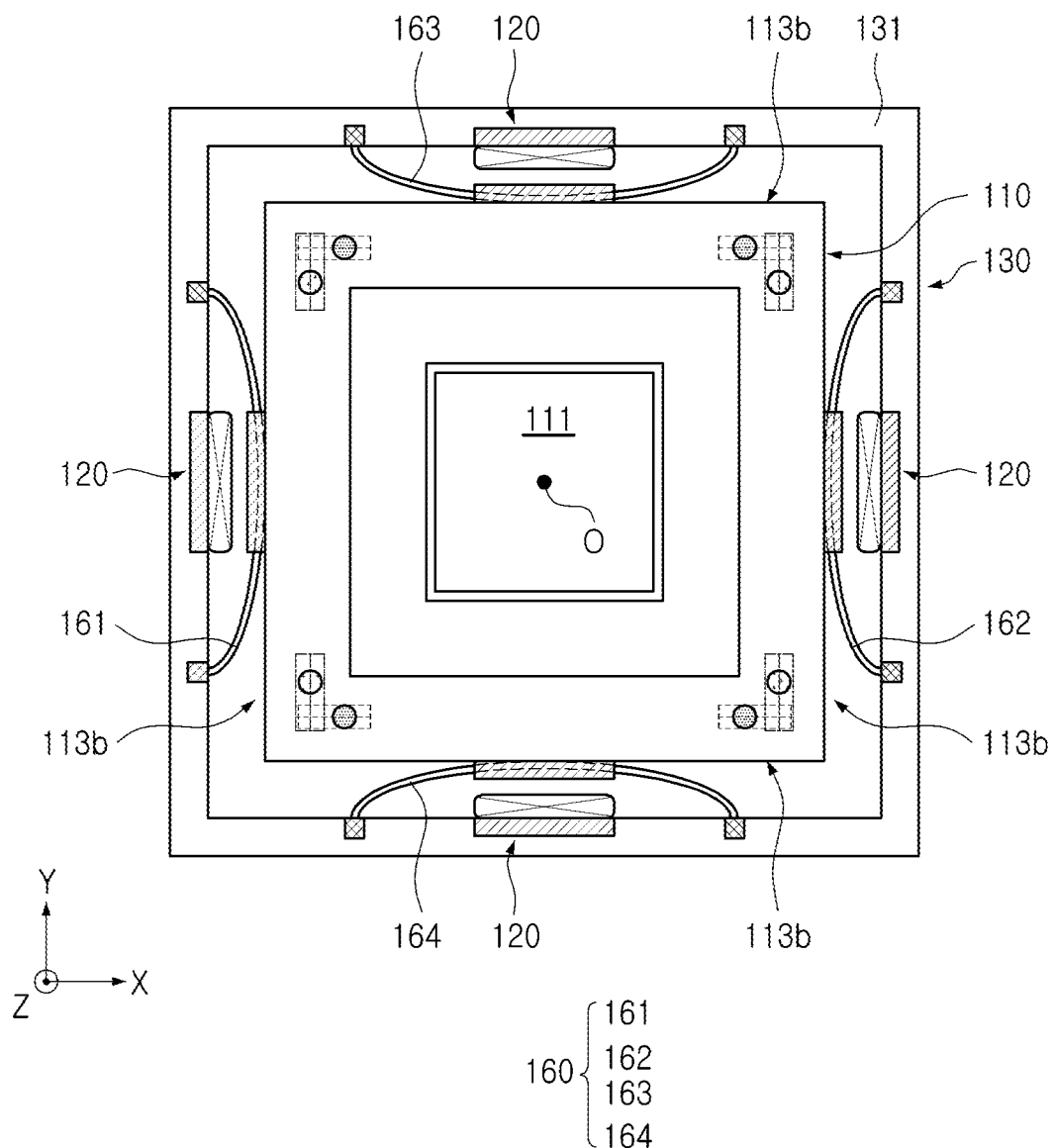
FIG. 8 is a diagram illustrating an elastic member providing restoring force to a first moveable body according to an example embodiment of the present disclosure.

FIG. 8 is a diagram illustrating an elastic member providing restoring force to a first moveable body according to an example embodiment.

Referring to FIG. 8, the OIS driver 120 may include an elastic member 160 providing a restoring force to the first movable body 110. The elastic member 160 may be disposed between the first movable body 110 and the fixed body 130, and when the first movable body 110 moves in one direction, the elastic member 160 may be deformed and may prove a restoring force to the first movable body 110.

In an example embodiment, the elastic member 160 may be a leaf spring. In this case, both ends of the elastic member 160 may be fixed to the fixed body 130, and may have a curved shape, curved toward the first movable body 110.

In an example embodiment, four elastic members 161, 162, 163, and 164 may be disposed to oppose each of the four side surfaces of the first movable body 110. For example, when the first movable body 110 moves in the −X-direction, the first elastic member 161 is compressed and pushes the first movable body 110 in the +X-direction. When the first movable body 110 moves in the +X-direction, the second elastic member 162 may be compressed and may push the first movable body 110 in the −X-direction. When the first movable body 110 moves in the +Y-direction, the third elastic member 163 may be compressed and may push the first movable body 110 in the −X-direction. When the first movable body 110 moves in the −Y-direction, the fourth elastic member 164 may be compressed and may push the first movable body 110 in the +Y-direction.

According to the aforementioned example embodiments, the camera may provide effective optical image stabilization with low power. Alternatively, according to an example embodiment, the effect of the magnetic field of the actuator driving the image sensor affecting the electronic component disposed outside the camera may be eliminated or reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor shifting module, comprising:
   a fixed body;
   a first movable body, movably disposed in the fixed body, comprising an image sensor having an imaging plane opposite to a first direction; and
   a driver, configured to move the first movable body in a direction orthogonal to the first direction with respect to the fixed body, comprising a driving coil coupled to one of the fixed body and the first movable body, and a driving yoke coupled to another of the fixed body and the first movable body,
   wherein the driving yoke is disposed to oppose the driving coil in the direction orthogonal to the first direction, and
   wherein, when current is applied to the driving coil, the first movable body is configured to move in the direction orthogonal to the first direction by electromagnetic interaction between the driving coil and the driving yoke.

2. The sensor shifting module of claim 1, wherein the driving yoke is a soft magnetic material.

3. The sensor shifting module of claim 1, wherein, when no current flows in the driving coil, a magnetic field due to the driving yoke is zero.

4. The sensor shifting module of claim 1, wherein the driving coil and the driving yoke oppose each other in a second direction orthogonal to the first direction, and electromagnetic interaction between the driving coil and the driving yoke is configured to move the movable body in the second direction.

5. The sensor shifting module of claim 1, wherein the driving coil and the driving yoke oppose each other in a second direction orthogonal to the first direction, the driving coil comprises a first driving coil and a second driving coil disposed on both sides of the first movable body in the second direction, respectively, and the driving yoke comprises a first driving yoke and a second driving yoke opposing the first driving coil and the second driving coil in the second direction, respectively.

6. The sensor shifting module of claim 1, wherein the driver further comprises a yoke disposed on one side of the driving coil, and the driving coil is disposed between the driving yoke and the yoke.

7. The sensor shifting module of claim 1, wherein the driving coil and the driving yoke oppose each other in a diagonal direction of the image sensor.

8. The sensor shifting module of claim 1, further comprising:
   an elastic member, disposed between the first movable body and the fixed body, configured to deform based on a movement of the first movable body with respect to the fixed body.

9. The sensor shifting module of claim 8, wherein the elastic member is a leaf spring.

10. A sensor shifting module, comprising:
    a fixed body;
    a first movable body, movably disposed in the fixed body, comprising an image sensor having an imaging plane opposite to a first direction;
    a driver, configured to move the first movable body in a direction orthogonal to the first direction with respect to the fixed body, comprising a driving coil coupled to one of the fixed body and the first movable body, and a driving yoke coupled to another of the fixed body and the first movable body;
    a second movable body disposed between the first movable body and the fixed body;
    a first ball member disposed between the fixed body and the second movable body; and
    a second ball member disposed between the second movable body and the first movable body,
    wherein the driving yoke is disposed to oppose the driving coil in the direction orthogonal to the first direction, and
    wherein, when current is applied to the driving coil, the first movable body is configured to move in the direction orthogonal to the first direction by electromagnetic interaction between the driving coil and the driving yoke.

11. The sensor shifting module of claim 10, wherein the fixed body and the second movable body include a first groove configured to accommodate, at least, a portion of the first ball member, and the second movable body and the first movable body include a second groove configured to accommodate, at least, a portion of the second ball member.

12. The sensor shifting module of claim 11, wherein the first groove extends in a second direction orthogonal to the first direction, and the second groove extends in a third direction orthogonal to each of the first direction and the second direction.

13. The sensor shifting module of claim 10, wherein the driver further comprises a first magnetic body, coupled to the second movable body, and a second magnetic body, coupled to each of the first movable body and the fixed body, opposing the first magnetic body.

14. The sensor shifting module of claim 13, wherein the second magnetic body comprises a through-portion, and the driver further comprises a position sensor disposed in the through-portion.

15. A camera module, comprising:
    a lens module comprising a lens; and
    a sensor shifting module, comprising:
    a fixed body;

a first movable body, movably disposed in the fixed body, comprising an image sensor opposing a first direction; and a driver, configured to move the first movable body in a direction orthogonal to the first direction with respect to the fixed body, comprising a driving coil, coupled to one of the fixed body and the first movable body, and a driving yoke coupled to another of the fixed body and the first movable body, wherein the driving yoke is disposed to oppose the driving coil in the direction orthogonal to the first direction, and a space between the driving yoke and the driving coil is an air gap.

16. The camera module of claim 15, wherein the driving yoke is a soft magnetic material.

17. The camera module of claim 15, further comprising:

an elastic member, disposed between the first movable body and the fixed body, configured to deform based on a movement of the first movable body with respect to the fixed body.

* * * * *